July 7, 1959  H. SCHANKLER  2,894,174
ELECTRICAL PHOTOFLASH DEVICE
Filed April 28, 1958
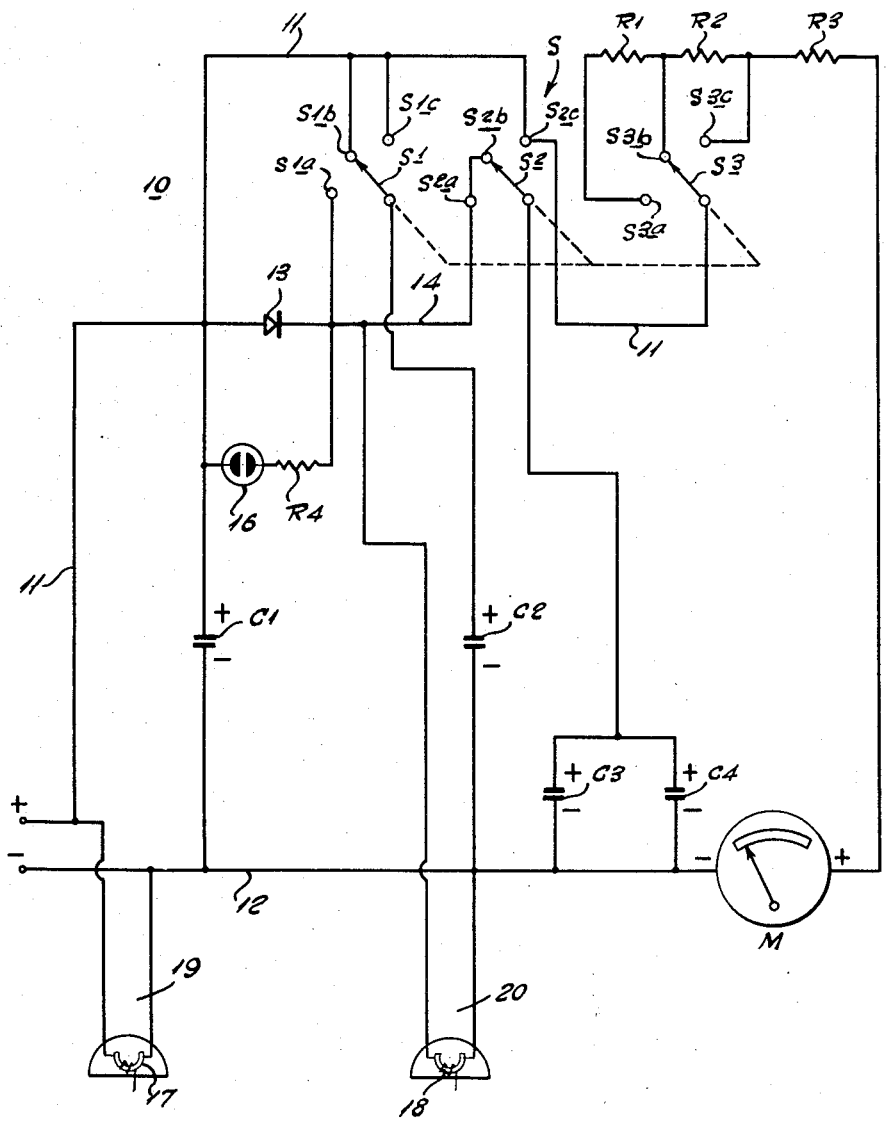
INVENTOR.
HAROLD SCHANKLER
BY
William R. Lieberman
ATTORNEY United States Patent Office 2,894,174
Patented July 7, 1959

2,894,174
ELECTRICAL PHOTOFLASH DEVICE
Harold Schankler, Brooklyn, N.Y., assignor to The FR Corporation, New York, N.Y., a corporation of New York Application April 28, 1958, Serial No. 731,266
13 Claims. (Cl. 315—230)

The present invention relates to a circuit network, and in particular it relates to an improved electrical photoflash device.

The conventional electrical photoflash unit generally includes a gaseous discharge flash tube having a pair of electrodes connected to the terminals of a high capacity storage condenser, and a trigger electrode which is usually energized by the discharge of a small condenser through the primary of a step-up transformer, the secondary of which is connected between the triggering electrode and one of the other electrodes. The condenser is charged in many ways. A vibrator type of power supply may be employed wherein a vibrator is actuated by a low voltage battery to produce an interrupted current which in turn is fed to the primary of a step-up transformer, the output of which is rectified by way of the vibrator or other rectification means and applied to the storage condenser. Where a source of A.C. is readily available this may be passed through a step-up transformer and rectified or a voltage multiplying circuit may be used and the output fed to the storage condensers. Transistor power supplies have also been suggested and employed.

Photoflash units of the above types possess numerous drawbacks and disadvantages. Among these is the lack of constancy in the amount of light emitted during a flash, resulting in improper exposures of photographs. The voltage output of the power supply and the voltage of the storage condenser may vary considerably. Since the light output varies approximately as the square of the voltage, the light variations are consequently substantially greater than the voltage variations. Another drawback is the length of time often required fully to charge the condenser, thus preventing film exposures under artificial flash light in rapid sequence. Further, there is generally no method by which the light output of the unit may be readily adjusted.

It is thus a principal object of the present invention to provide an improved circuit network.

Another object of the present invention is to provide an improved electrical photoflash device.

Still another object of the present invention is to provide an improved electrical photoflash device having an adjustable light output.

A further object of the present invention is to provide an improved electrical photoflash device in which the amount of available light is readily accurately ascertainable.

The above and other objects of the present invention will become apparent from a reading of the following description taken in conjunction with the accompanying drawing, which is a schematic view of a photoflash device embodying the present invention.

In a sense, the present invention contemplates the provision of an improved circuit network comprising a first gaseous discharge tube having a pair of principal electrodes and a triggering electrode, a first storage condenser connected between said principal electrodes, means connecting said first storage condenser to a source of direct current, a unilateral impedance, a second storage condenser, and means connecting said second storage condenser across said first storage condenser through said unilateral impedance.

Referring now to the drawing which illustrates a preferred embodiment of the present invention, reference numeral 10 generally designates the improved photoflash unit which includes a pair of conductor lines 11 and 12 which are connected to the positive and negative terminals respectively of any suitable source of D.C. voltage of the order recommended for use with the particular photoflash tube employed. The power supply may, as desired, include a transformer and rectifier arrangement connected to a source of alternating current, a voltage multiplying rectifier, a vibrator or transistor power supply or a battery. There is provided a three-pole, three-position switch S which may be of the gang type and includes three switch arms $S^1$, $S^2$, and $S^3$ respectively. Associated with switch arm $S^1$ are contacts $S^{1a}$, $S^{1b}$ and $S^{1c}$; with switch arm $S^2$, contacts $S^{2a}$, $S^{2b}$ and $S^{2c}$; and with switch arm $S^3$, contacts $S^{3a}$, $S^{3b}$ and $S^{3c}$. Switch arms $S^1$, $S^2$, and $S^3$ are so ganged and arranged that they simultaneously respectively engage contacts $S^{1a}$, $S^{2a}$, and $S^{3a}$, $S^{1b}$, $S^{2b}$, $S^{3b}$ or $S^{1c}$, $S^{2c}$, $S^{3c}$.

Line 11 is connected by way of a unilateral impedance 13 to a conductor line 14, the unilateral impedance being so oriented as to permit the substantially free flow of positive current from line 11 to line 14 but presenting a high resistance to the reverse flow of current. Unilateral impedance 13 may be in the form of a selenium rectifier, a silicon or germanium diode or any other suitable high current unilateral impedance preferably having a high inverse resistance. Unilateral impedance 13 is shunted by a voltage indicator in the form of a neon bulb 16 connected in series with a current limiting resistor R4.

A first, high capacity storage condenser C1 is connected between the lines 11 and 12 in properly oriented condition. A second storage condenser C2, preferably of the same capacity as the storage condenser C1, is connected between line 12 and switch arm $S^1$. Third and fourth storage condensers C3 and C4 are connected in parallel between line 12 and switch arm $S^2$. Each of the condensers C3 and C4 are preferably of approximately the same value as the condenser C1 and a single condenser having twice the capacity of condenser C1 may be substituted for condensers C3 and C4.

There are provided a pair of photoflash electrical gaseous discharge tubes 17 and 18, each of the tubes including a pair of principal electrodes and triggering electrodes 19 and 20, respectively, of conventional construction. Photoflash tube 17 is connected between lines 11 and 12 and photoflash tube 18 is connected between lines 14 and 12. Triggering electrodes 19 and 20 are connected to individual pulsing circuits of well known construction so as to permit the selective firing of the tubes 17 and 18 either substantially simultaneously or in any desired sequence.

Switch contact $S^{1a}$ is connected to line 14, and contacts $S^{1b}$ and $S^{1c}$ are connected to line 11. Switch contacts $S^{2a}$ and $S^{2b}$ are connected to line 14 and contact $S^{2c}$ is connected to line 11. Switch arm $S^3$ is also connected to line 11 and switch contact $S^{3a}$ is connected to switch contact $S^{3b}$ by way of a resistor R1. Switch contact $S^{3b}$ is connected to switch contact $S^{3c}$ by way of a resistor R2, and switch contact $S^{3c}$ is connected by way of a resistor R3 to the positive terminal of a milliammeter M, the negative terminal of which is connected to line 12. The milliammeter M is preferably logarithmically calibrated so as to provide a direct reading of the light available to photoflash tube 17.

As a specific example of the values of the various components resistor R4 is 68K ohms, resistor R1 is 4 megohms, and resistors R2 and R3 are each 2 megohms. Each of the condensers C1, C2, C3 and C4 are 230 microfarads, the unilateral impedance 13 is a rectifier type RR16Y1, the neon bulb 16 is of the NE51 type having a glow voltage of approximately 60 volts, and the milliammeter M has a full scale swing of 1 milliampere. The photoflash tubes 17 and 18 may be the GE–FT 106 or GE–FT 119 types, or any other suitable type.

Considering now the operation of the improved unit described above, it should first be noted that no matter what position switch S assumes storage condensers C1, C2, C3 and C4 will be connected either directly or through a low impedance to the source of current. Condenser C1 will always be connected directly across lines 11 and 12. When the switch arms are in their *a* position, engaging contacts 1*a*, 2*a* and 3*a*, condensers C2, C3 and C4 are connected to the source of current through the unilateral impedance 13; when the switch arms are in their *b* position (engaging contacts 1*b*, 2*b* and 3*b*) condenser C2 is connected directly across the voltage supply and condensers C3 and C4 are connected through the unilateral impedance 13; and when the switch arms are in their *c* position (engaging contacts 1*c*, 2*c* and 3*c*) all the condensers are connected directly to the voltage supply, by-passing unilateral impedance 13. It is thus apparent that at all times all of the storage condensers are connected either directly or through a very low impedance to the voltage source, thus either rapidly charging them or maintaining them at full charge.

In discharging flash tubes 17 and 18 when the switch arms are in their *a* position and the trigger electrode 19 is energized, only the storage condenser C1 will discharge through flash tube 17 since flash tube 17 is connected directly to the condenser C1 and to the other condensers through the relatively high resistance of the unilateral impedance 13. However, if both electrodes 19 and 20 are simultaneously triggered condenser C1 will discharge through flash tube 17 and condensers C2, C3 and C4 will discharge through flash tube 18. It is important to note that, in the latter case, triggering should either be simultaneous or the triggering electrode 20 energized slightly later than the triggering electrode 19. If the reverse is true all storage condensers will discharge through the flash tube 18.

When the switch arms are in the *b* position, as shown, triggering of flash tube 17 will result in the discharge of condensers C1 and C2 through the flash tube providing twice the light available when the flash tube 17 is discharged with the switches in their *a* position. If the flash tube 18 is triggered with the switch arms in their *b* position slightly after or substantially simultaneous with the triggering of the flash tube 17 condensers C3 and C4 will discharge through the flash tube 18 providing an amount of light substantially equal to that provided by the discharge of the condensers C1 and C2 through the flash tube 17.

When the switch arms are in their *c* position, all four condensers may be discharged either through the flash tube 17 or the flash tube 18.

Meter M, as a volt meter, is twice as sensitive when the switch arm S³ is in the *b* position than when it is in the *c* position since the resistors in series with the meter are twice as great in the former position as in the latter position. When the switch arm S³ is in its *a* position, the meter voltage sensitivity is twice that of the meter when the switch arm is in the *b* position and four times that of the meter when the switch arm is in the *c* position by reason of the aggregate resistance in series with the meter being respectively twice and four times as great. This change in sensitivity corresponds with the change in the capacity of the storage condensers C1, C2, C3 and C4 which will discharge through the triggered flash tube 17, being of the ratio of 1:2:4 as the switch moves from the *a* to the *b* to the *c* position.

Neon tube 16 is provided to indicate when the switch S may be operated. When the tube 16 is lit it is an indication that a high voltage difference may occur between a switch arm and a corresponding contact at which time switching should preferably not be effected by reason of the resulting arcing at the contacts. However, as soon as the tube 16 quenches switching may be safely effected.

While there has been described and illustrated a preferred embodiment of the present invention it is apparent that numerous alterations and omissions may be made without departing from the spirit thereof.

I claim:

1. An improved circuit network comprising a first gaseous discharge tube having a pair of principal electrodes and a triggering electrode, a first storage condenser connected between said principal electrodes, means connecting said first storage condenser to a source of direct current, a unilateral impedance, a second storage condenser, and means connecting said second storage condenser across said first storage condenser through said unilateral impedance.

2. An improved circuit network in accordance with claim 1, including means selectively connecting said second storage condenser directly across said first storage condenser.

3. An improved circuit network in accordance with claim 1, wherein said first and second storage condensers have substantially equal capacities.

4. An improved circuit network in accordance with claim 1, including a voltage indicating device connected across said unilateral impedance.

5. An improved circuit network in accordance with claim 4, wherein said voltage indicating device includes a glow discharge tube.

6. An improved circuit network in accordance with claim 1, including a voltmeter connected across said first storage condenser.

7. An improved circuit network in accordance with claim 2, including a voltmeter connected across said first storage condenser and means operated concurrently with said second condenser connecting means for varying the sensitivity of said voltmeter.

8. An improved circuit network in accordance with claim 1, including a second gaseous discharge tube including a pair of principal electrodes, and means connecting said second discharge tube across said second storage condenser.

9. An improved circuit network in accordance with claim 2, including a third storage condenser and means selectively connecting said third storage condenser directly across said first storage condenser and to said first storage condenser through said unilateral impedance.

10. An improved circuit network in accordance with claim 2, including a third storage condenser and means selectively connecting said third storage condenser directly across said first storage condenser and to said first storage condenser through said unilateral impedance, said third storage condenser having a capacity substantially twice that of said first storage condenser.

11. An improved circuit network comprising a first gaseous discharge tube having a pair of principal electrodes, a first storage condenser connected between said principal electrodes, means connecting said first storage condenser to a source of direct current, a unilateral impedance, a second storage condenser, and means connecting said second storage condenser across said first storage condenser through said unilateral impedance.

12. An improved switching device including a pair of poles selectively movable into and out of mutual engagement, and means for indicating the voltage between said poles.

13. An improved switching device in accordance with claim 12, wherein said voltage indicating device includes a glow discharge tube.

References Cited in the file of this patent

UNITED STATES PATENTS 2,478,901     Edgerton _____ Aug. 16, 1949

FOREIGN PATENTS 750,224     Great Britain _____ June 13, 1956